US012623707B2

(12) United States Patent　(10) Patent No.: US 12,623,707 B2

Gao et al.　(45) Date of Patent: May 12, 2026

(54) WEIGHT MEASUREMENT ADJUSTMENT AND INHIBITION BASED ON SENSOR MEASUREMENTS

(71) Applicant: Maplebear Inc., San Francisco, CA (US)

(72) Inventors: Lin Gao, Miami, FL (US); Michael Joseph Sanzari, Caldwell, NJ (US); Yilin Huang, Shanghai (CN); Shiyuan Yang, Shanghai (CN); Ahmed Beshry, New York, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/489,792

(22) Filed: Oct. 18, 2023

(65) Prior Publication Data

US 2024/0043057 A1　Feb. 8, 2024

Related U.S. Application Data

(63) Continuation of application No. 17/821,876, filed on Aug. 24, 2022, now Pat. No. 11,827,263, which is a (Continued)

(51) Int. Cl.
B62B 5/00　(2006.01)
B62B 3/14　(2006.01)
(Continued)

(52) U.S. Cl.
CPC .............. B62B 5/00 (2013.01); B62B 3/1468 (2013.01); G01G 19/12 (2013.01); G01G 21/00 (2013.01); B62B 2203/50 (2013.01)

(58) Field of Classification Search
CPC ..... B65B 5/00; B65B 3/1468; B65B 2203/50; G01G 19/12; G01G 21/00; G01G 19/4144; G01G 19/415; G01G 19/028
See application file for complete search history.

(56) References Cited

U.S. PATENT DOCUMENTS 3,556,237 A　1/1971　Allison
3,826,319 A　7/1974　Loshbough
(Continued)

FOREIGN PATENT DOCUMENTS

WO　WO 2016/135142 A1　9/2016

OTHER PUBLICATIONS

European Patent Office, Extended European Search Report, European Patent Application No. 21218320.6, May 2, 2022, 11 pages.
(Continued)

*Primary Examiner* — Randy W Gibson
(74) *Attorney, Agent, or Firm* — Fenwick & West LLP

(57) ABSTRACT

Disclosed herein relates to a system, comprising: at least one load receiver mounted on a shopping cart or basket and configured to receive an item placed into the shopping cart or basket for a weighing operation; a plurality of sensors configured to detect a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver; and a processor configured to determine an actual weight of the item based on at least a portion of the plurality of parameters.

16 Claims, 2 Drawing Sheets

Related U.S. Application Data continuation of application No. 16/995,157, filed on Aug. 17, 2020, now Pat. No. 11,453,426, which is a continuation of application No. 16/544,345, filed on Aug. 19, 2019, now Pat. No. 10,745,039.

(51) Int. Cl.
  *G01G 19/12*    (2006.01)
  *G01G 19/415*   (2006.01)
  *G01G 21/00*    (2006.01)

(56)               References Cited

U.S. PATENT DOCUMENTS

| 3,836,755 A | | 9/1974 | Ehrat |
| 4,071,740 A | | 1/1978 | Gogulski |
| 4,494,620 A | * | 1/1985 | Knothe ............... G01G 23/002 |
| | | | 177/255 |
| 4,802,541 A | * | 2/1989 | Bator ...................... G01G 7/04 |
| | | | 177/189 |
| 5,161,628 A | | 11/1992 | Wirth |
| 5,230,393 A | | 7/1993 | Mezey |
| 5,623,128 A | | 4/1997 | Grimm et al. |
| 6,137,065 A | * | 10/2000 | Zefira .................. G01G 23/002 |
| | | | 33/366.26 |
| 7,897,884 B2 | | 3/2011 | Harish |
| 8,371,504 B2 | | 2/2013 | Connelly |
| 8,464,945 B2 | | 6/2013 | Connelly |
| 8,844,073 B2 | | 9/2014 | Riley et al. |
| 10,900,824 B2 | | 1/2021 | Godsey |
| 2007/0181349 A1 | * | 8/2007 | Beck .................... G01G 11/043 |
| | | | 177/25.13 |
| 2011/0119028 A1 | | 5/2011 | Bishop |
| 2018/0108072 A1 | | 4/2018 | Jones et al. |
| 2018/0218351 A1 | | 8/2018 | Chaubard et al. |

OTHER PUBLICATIONS

United States Office Action, U.S. Appl. No. 16/544,345, filed Nov. 27, 2019, 8 pages.
United States Office Action, U.S. Appl. No. 16/995,157, filed Mar. 16, 2022, 5 pages.
United States Office Action, U.S. Appl. No. 17/821,876, filed May 3, 2023, 8 pages.
United States Office Action, U.S. Appl. No. 17/821,876, filed Mar. 2, 2023, 7 pages.

* cited by examiner

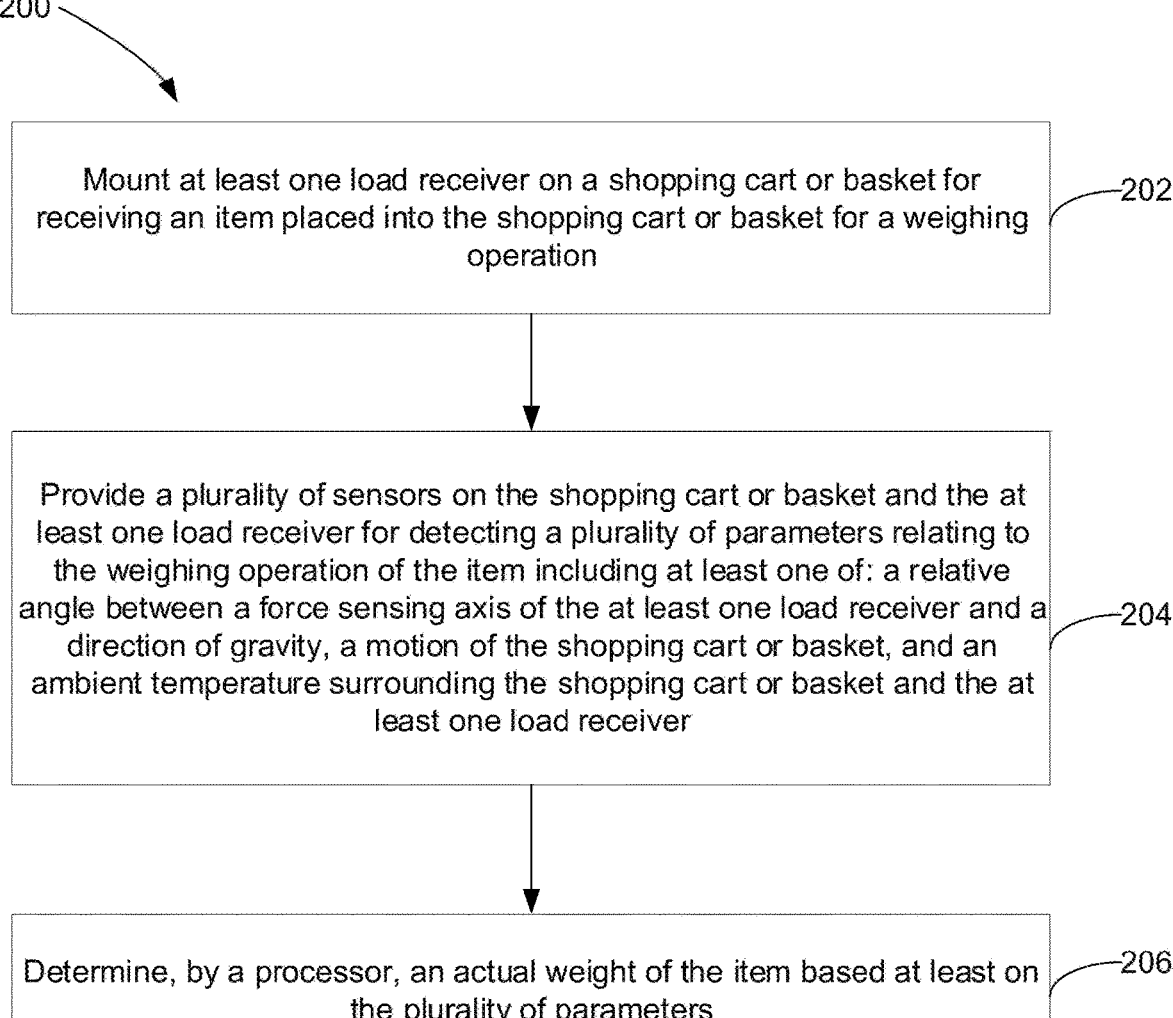

200

Mount at least one load receiver on a shopping cart or basket for receiving an item placed into the shopping cart or basket for a weighing operation — 202

Provide a plurality of sensors on the shopping cart or basket and the at least one load receiver for detecting a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver — 204

Determine, by a processor, an actual weight of the item based at least on the plurality of parameters — 206

FIG. 2

WEIGHT MEASUREMENT ADJUSTMENT AND INHIBITION BASED ON SENSOR MEASUREMENTS

CROSS REFERENCE TO RELATED APPLICATION

This application is a continuation of U.S. patent application Ser. No. 17/821,876, filed Aug. 24, 2022, which is a continuation of U.S. patent application Ser. No. 16/995,157 filed on Aug. 17, 2020, which is a continuation of U.S. patent application Ser. No. 16/544,345 filed on Aug. 19, 2019, each of which is incorporated herein by reference.

TECHNICAL FIELD

The present disclosure relates generally to an accurate weighing system and method operable with a movable device, and more specifically, to correcting a weight measurement of merchandise placed in a movable shopping cart or basket based on, e.g., circumstances associated with the movable shopping cart or basket.

BACKGROUND

Customers typically use a shopping cart or a shopping basket during their store visits at convenience stores, grocery markets and retail outlets. There is a need to accurately determine a weight of merchandise placed into a movable shopping cart/basket based on, e.g., circumstances associated with the movable shopping cart/basket.

BRIEF SUMMARY OF THE INVENTION

Disclosed herein is a system, comprising: at least one load receiver mounted on a shopping cart or basket and configured to perform a weighing operation of an item placed into the shopping cart or basket. The system also comprises a plurality of sensors configured to detect a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver. The system also comprises a processor configured to determine an actual weight of the item based on at least a portion of the plurality of parameters.

The present disclosure further discloses a method, comprising, mounting at least one load receiver on a shopping cart or basket for receiving an item placed into the shopping cart or basket for a weighing operation. The method also comprises providing a plurality of sensors on the shopping cart or basket and the at least one load receiver for detecting a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver. The method additionally comprises determining, by a processor, an actual weight of the item based at least on the plurality of parameters.

Moreover, the present disclosure discloses a non-transitory computer-readable medium storing computer code executable by a processor of a weighing system operable with a shopping cart or basket. The shopping cart or basket includes at least one load receiver for receiving an item placed into the shopping cart or basket for a weighing operation. The non-transitory computer-readable medium comprises code for causing the processor of the weighing system to: control a plurality of sensors provided on the shopping cart or basket and the at least one load receiver to detect a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver; and determine an actual weight of the item based at least on the plurality of parameters.

BRIEF DESCRIPTION OF THE FIGURES

For a more complete understanding of the example aspects, references are made to the following descriptions taken in connection with the accompanying drawings in which:

FIG. 2 is a flowchart illustrating a method implemented by the weighing system of FIG. 1, in accordance with aspects of the present disclosure.

Figure 1:
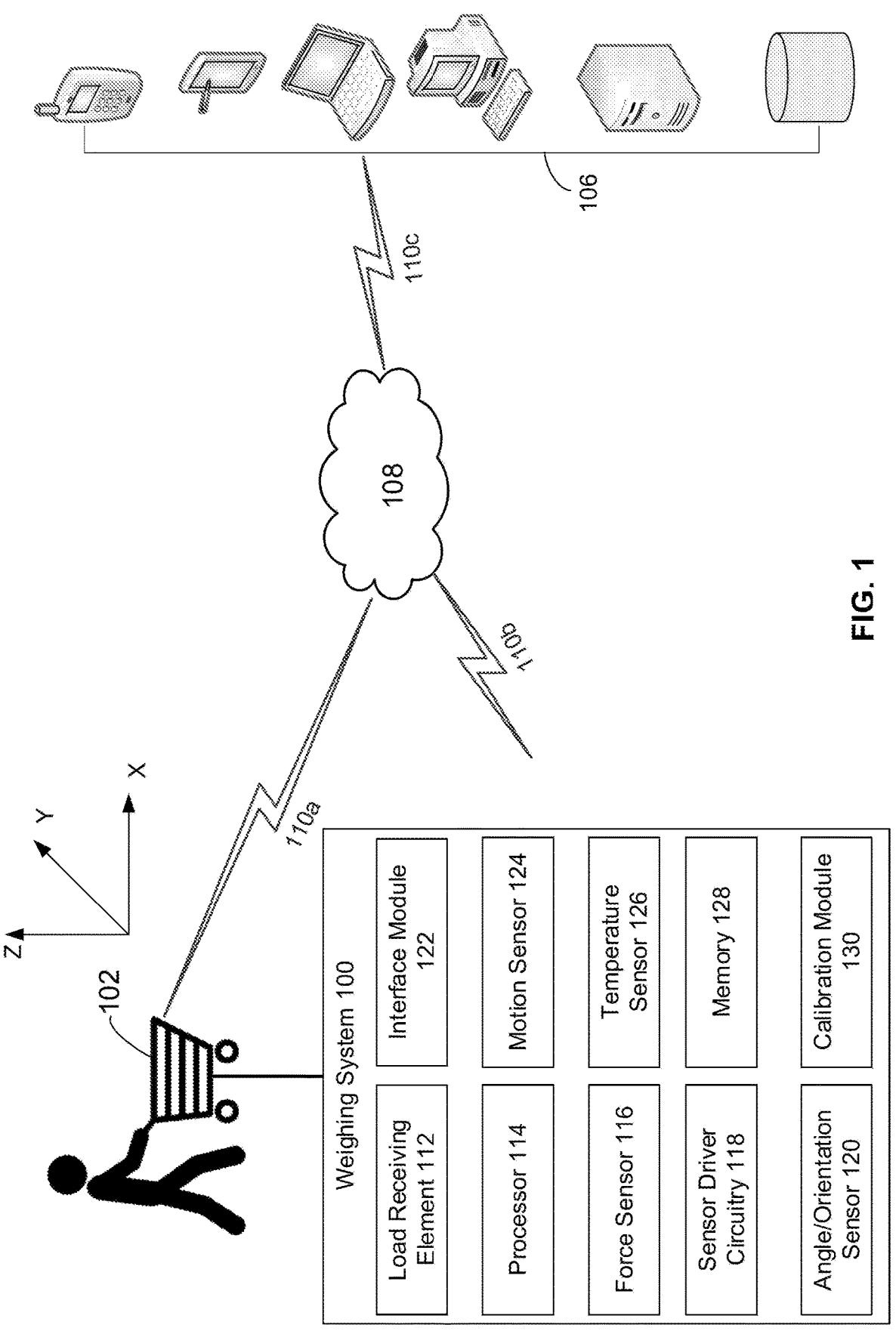
FIG. 1 illustrates a weighing system operable with a movable shopping cart or basket, in accordance with aspects of the present disclosure.

The drawings referred to in this description are not to be understood as being drawn to scale except if specifically noted, and such drawings are only exemplary in nature.

DETAILED DESCRIPTION

Among other features, disclosed herein is an accurate weighing system and method operable with a moving device such as a shopping cart/basket used in a retail environment. Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

FIG. 1 shows a weighing system 100 operable with a movable device, in accordance with aspects of the present disclosure. Movable device may be a self-checkout vehicle 102 used by a customer in a retail environment (e.g., a department store or a grocery store) for storing and transporting selected merchandise. The term "movable device" may refer to any portable and/or movable physical structure supplied by a retailer to its customers for use inside a retail environment, such as a wheeled shopping cart in various shapes and dimensions, or a shopping basket/bag/container in various shapes and sizes, a wheelchair or motorized vehicle integrated with a shopping receptacle for use by handicapped or disabled shoppers, or any physical structure that may follow or be carried by a customer in a retail environment. Weighing system 100 may be configured to accurately determine the weight of one or more items placed into and carried by self-checkout vehicle 102. In one aspect, weighing system 100 may obtain weight information of each item as it is added into vehicle 102, as well as keep track of a cumulative weight of all items in the vehicle 102.

Although the present disclosure will be described herein with respect to a retail environment, it should be understood that aspects of the present disclosure may be implemented in a facility to control, e.g., inventory and theft, or in other appropriate settings where cumulative weight of all objects in a transportation and storage structure needs to be accurately and contemporaneously measured.

Each of the weighing system 100 and self-checkout vehicle 102 may communicate with each other and with one or more local and/or remote computing devices 106 via a communication network 108. For example, one or more computing devices 106 may be configured to exchange various signals and data with a plurality of sensors and components of the weighing system 100 and/or the self-checkout vehicle 102 via the communication network 108 using suitable network connections and protocols 110*a*, 110*b*, and 110*c*.

Computing devices 106 of the present disclosure may comprise at least one processor, microprocessor or multi-core processor configured to handle data processing and calculation. Computing devices 106 may include at least one of personal computers, servers, server farms, laptops, tablets, mobile devices, smart phones, smart watches, fitness tracker devices, cellular devices, gaming devices, media players, network enabled printers, routers, wireless access points, network appliances, storage systems, gateway devices, smart home devices, virtual or augmented reality devices, or any other suitable devices that are deployed in the same or different communication network of the weighing system 100 and self-checkout vehicle 102. In one aspect, computing devices 106 may be configured to provide functionalities for any connected devices such as sharing data or provisioning resources among multiple client devices, or performing computations for each connected client device.

Here, a communication network (e.g., communication network 108) may refer to a geographically distributed collection of computing devices or data points interconnected by communication links and segments for transporting signals and data therebetween. A protocol (e.g., protocols 110*a*, 110*b*, and 110*c*) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

In another aspect, the communication network 108 may be Cloud-based and may provide computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc.

It is to be appreciated that weighing system 100 and self-checkout vehicle 102 may include any suitable and/or necessary interface components (not shown), which provide various adapters, connectors, channels, communication paths, to facilitate exchanging signals and data between various hardware and software components of the weighing system 100 and self-checkout vehicle 102, the computing devices 106, and any applications, peer devices, remote or local server systems/service providers, additional database system(s), and/or with one another that are available on or connected via the underlying network 108 and associated communication channels and protocols 110*a*, 110*b*, and 110*c* (e.g., Internet, wireless, LAN, cellular, Wi-Fi, WAN).

According to aspects of the present disclosure, weighing system 100 may comprise at least one load receiving element 112 coupled to the self-checkout vehicle 102 in any suitable ways to ensure proper weighing of the merchandise placed into and carried by the vehicle 102. The main body of the load receiving element 112 is preferably a weather-resistant, low-profile enclosure structure configured to contain and protect various sensors, modules, components and electrical circuitry of the weighing system 100. Vehicle 102 may comprise at least one storage space defined by a generally horizontal base and upright side surfaces. In one embodiment, the load receiving element 112 may be positioned and secured underneath a central area of the base of vehicle 102 in order to achieve a more centered introduction of weight force on force sensing modules of weighing system 100. The top surface of load receiving element 112 may be a planar surface, parallel to the horizontal base of vehicle 102.

Various sensors, modules, components and electrical circuitry of the weighing system 100 may be configured by or may operate in connection with a processor 114 to detect and adjust a number of parameters relating to a weighing operation of the merchandise in the vehicle 102.

For example, weighing system 100 may include at least one force sensor 116 configured to measure shear forces applied to the top surface of load receiving element 112, thereby measuring the mass of the merchandise in the vehicle 102. In one embodiment, a deformable member may be disposed within the housing of load receiving element 112 and may deform or deflect in response to a force applied along a selected force vector, which in this case is a vertically oriented force due to gravity. Deformable member may be manufactured to minimize or eliminate at least some of the forces applied on other force vectors, thereby substantially isolating the desired forces to be sensed. Force sensor 116 in one embodiment may include four force transducers $T_1$, $T_2$, $C_1$, $C_2$, preferably strain gauges that are oriented on the deformable member and electrically connected to form a Wheatstone bridge configuration. Strain gauges $T_1$, $T_2$ may be placed in tension by an applied force, and the remaining gauges $C_1$, $C_2$ are placed in compression. The output of the Wheatstone bridge circuit is primarily responsive to force along a desired force vector (e.g., the direction of gravity), with other forces being significantly minimized or eliminated from the output.

It should be appreciated that additional sensors and circuitry may be used to detect different effects along different force vectors, including horizontal forces, bending moment, lateral forces, etc. In addition, other types of force sensors may be used as alternatives to strain gauges, including suitable capacitive transducers, resistive transducers, resonating transducers (e.g., vibrating strings, piezoelectric crystals), optical sensors, solid state strain sensors, etc. For example, a resistive or capacitive sensor may be used to detect forces applied to the top surface of load receiving element 112. Such a sensor may include first and second electrodes that are disposed inside the housing of load receiving element 112 and spaced apart a predetermined distance from each other in an initial position. A measurable capacitance exists between the first and second electrodes. When a force applied to the load receiving element 112 causing a change in the distance between the first and second electrodes, a change in the capacitance between the electrodes may be measured to determine information related to the applied force.

In one aspect, weighing system 100 may include a driver circuitry 118 to provide various control signals to the at least one force sensor 116 and receive and transmit output signals of the at least one force sensor 116 to other modules or components of weighing system 100. For example, driver circuitry 118, controlled by processor 114, may generate a driving signal to the at least one force sensor 116 in order to initiate a weighing operation. When multiple force sensors 116 are used and disposed under the top surface of the load receiving element 112, a potentiometer (variable resistor) and appropriate circuitry may be used to apportion the current from the driving signal to scale the relative magnitudes of the driving voltages supplied to each force sensor 116.

Force sensor output signal, which is indicative of the pressure or force it detects continuously in real-time, may be transmitted to an amplifier and an analog-to-digital (AID) converter for generating digital signals. The processor 114 of weighing system 100 may be configured to receive the digital signals for further processing and routing.

Moreover, weighing system 100 may include at least one angle/orientation sensor 120 configured to measure a relative angle between a force-sensing axis of the load receiving element 112 and a direction of gravity. In one aspect, the angle/orientation sensor 120 may be installed within the enclosure of the load receiving element 112 and measure parameters in one, two, or three dimensions (i.e., at least one or more of the coordinate axes: X, Y, and Z). Device alignment of the angle/orientation sensor is shown in FIG. 1 for a three-dimensional (3D) Cartesian coordinate system. In particular, for the device position shown in FIG. 1, the X-axis is horizontal (left to right) and has no gravity component, the Y-axis is horizontal (back to front) and has no gravity component, and the Z-axis is vertical (bottom to top) and has the entire gravity component. The angle/orientation sensor 120 may include a force-sensing axis, such that it generates an output indicating a force of 1G (9.81 m/s$^2$) when this sensing axis is perpendicular to the force of gravity. When the sensing axis is tilted, the force of gravity acts at an angle to the axis. In response to tilting the sensing axis, the output signal of angle/orientation sensor 120 may decrease, indicating a lower sensed level of acceleration. This decrease may continue until the sensing axis is positioned parallel to the force of gravity, at which point the signal may reach an output level indicative of a force of 0G. Accordingly, the relationship between the direction of gravity and the forcing sensing axis of angle/orientation sensor 120 may be used to determine a tilt angle of the angle/orientation sensor 120 and the load receiving element 112 with respect to the local gravitational field. Alternatively, the angle/orientation sensor 120 may have three orthogonal sensing axes, and configured to monitor the tilt angle for each of the three sensing axes relative to the local gravitational field.

When the tilt angle is detected to be within a correctable range, calculation of the force applied on the top surface of load receiving element 112 (i.e., the weight of merchandise placed into the self-checkout vehicle 102) may be compensated as a function of this tilt angle. That is, the measurement of this tilt angle by the angle/orientation sensor 120 may be used to correct for the difference between the force as measured by the load receiving element 112 and the actual weight of the merchandise to be weighed, thereby allowing for the weighing system 100 to be accurate across a wide range of angles. In one embodiment, machine learning may be used to at least train weighing system 100 to determine the correctable range for the tilt angle.

However, when the angle/orientation sensor 120 detects that the relative angle between its force-sensing axis and the direction of gravity exceeds a predetermined threshold, the processor 114 of weighing system 100 may determine that weight measurement may not be accurately corrected. The predetermined threshold for the tilt angle may be ±45°, or +40°, or +35°, or +30°, or +25°, or +20°, or +15°, or +10°, or +5°, or +3°, depending upon specific measurement precision requirement for the weighing system 100. The processor 114 of the weighing system 100 may generate a signal to the force sensor 116 and/or the angle/orientation sensor 118 in order to temporarily inhibit a weight measurement to be taken by the weighing system 100. Simultaneously, the processor 114 may be configured to generate signals to an interface module 122 by blanking a corresponding digital weight indicator (i.e., displaying non-metro-logically significant readings) of weighing system 100, or returning values to any interfaced system or device that cannot be interpreted as a measurement, or inhibiting a weight measurement from being recorded for a predetermined period of time. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For example, in response to detecting an out-of-range tilt angle of the load receiving element 112 and no valid weight measurement can be taken over a predetermined period of time (e.g., over 2 minutes), the processor 114 of weight system 100 may obtain and transmit the real-time location information (e.g., via a global positioning system (GPS) sensor (not shown)) and identifying information (e.g., a unique identifier) of the load receiving element 112 and/or the self-checkout vehicle 102 to another computing device (e.g., a local or remote server system 106) via the communication network 108. As a result, a notification may be generated and routed, either by processor 114 or server 106, to appropriate personnel (e.g., store staff) with specific location and identifying information of the load receiving element 112 and/or the self-checkout vehicle 102 in case any assistance is needed by a customer.

Moreover, weighing system 100 may use a motion sensor 124 (e.g., 1-axis, 2-axis, 3-axis or multi-axis accelerometer, gyroscopes or any suitable sensor) to detect a motion of the load receiving element 112 against a first predetermined threshold, or a standard deviation in weight readings as measured by the load receiving element 112 against a second predetermined threshold, and determine whether a valid weight measurement is available.

For example, in order to improve the accuracy and reliability of weighing system 100, the motion sensor 124 may be configured to detect the degree of vibration and/or shock of the load receiving element 112. In one embodiment, a vibration sensor (an example form of motion sensor 124) may be installed on the load receiving element 112 and configured to generate a voltage signal that is proportional to the amount of acceleration or vibration of the load receiving element 112. One example device may be an accelerometer-based micro-electro-mechanical system (MEMS) device, which can detect acceleration in two or three axis.

Voltage signal from the vibration sensor may be fed into an AJD converter for generating a digital signal that is proportional to the amount of acceleration or vibration measured by the vibration sensor. For example, a low-speed AID converter may be used to convert a low-bandwidth (e.g., less than 50 Hz) signal from an analog voltage to a digital value. Operating as an ultra-low power device, the processor 114 of weighing system 100 may be configured to sample the A/D converter for a very short period of time at a very slow rate (e.g., measure for a few milliseconds every five seconds).

In another embodiment, the motion sensor 124 may detect acceleration on each of its axis. The result may include a constant DC voltage from the axis that is affected by gravity. In order to detect acceleration only from vibration and not gravity, the processor 114 of weighing system 100 may be configured to determine the difference or derivative between consecutive samples received from the motion sensor 124 so as to remove the DC component and the effect from gravity and tilting of the sensor 124. A filter circuitry (not shown) may also be used to smooth the outputs from the A/D converter to reduce the variance from successive samples. Raw A/D samples may be processed by the filter circuitry to generate a smoother numeric value representing the level of vibration of the load receiving element 112. A sample may be taken every five seconds on each axis of the motion sensor 124. The Delta or difference between two successive samples may be taken from the corresponding axis. In order to detect vibration with greater sensitivity, the Deltas may be integrated over multiple samples (e.g., 5 samples or every 25 seconds) to produce a filtered vibration value. Other means of filtering, such as a moving filter or infinite impulse response (IIR) filter, may be used.

The processor 114 of weighing system 100 may compare the filtered vibration value to a threshold to determine a current motion state of the load receiving element 112. To account for momentary or temporary motion changes, a motion state may be confirmed when it is maintained for a predetermined period of time (e.g., 40 seconds). If the filtered vibration value exceeds the threshold, the processor 114 may determine that the load receiving element 112 is moving.

In accordance with additional aspects of the present disclosure, weighing system 100 may include at least one temperature sensor 126 configured to adjust a weight measurement that may be affected by ambient conditions surrounding the weighing system 100 including but are not limited to temperature, humidity, and pressure. For example, ambient temperature may cause changes in the load receiving element 112, changes in resistance of components in the signal chain such as wires, as well as changes in A/D converters typically interfaced with various sensors and modules of the weighing system 100. By measuring ambient temperature, the processor 114 of weighing system 100 may correct the difference between the actual weight of the applied load and the weight measurement received from the load receiving element 112. That is, by measuring current ambient conditions (e.g., a current temperature), weighing system 100 may apply corrections to raw sensor readings and generate an accurate measurement of the true weight of the applied load to the load receiving element 112. In one aspect, these corrections may also be applied to the angle/orientation sensor 120 and corresponding circuitry to correct for any sensor drift induced by temperature. If the temperature sensor 126 detects a temperature outside of its designated operating range (e.g., operational temperature of −20 to 80 degrees Celsius or other predetermined temperature range), the processor 114 of weighing system 100 may generate a signal to inhibit a weight measurement from being displayed or recorded.

In accordance with another aspect of the present disclosure, weight signals received from the load receiving element 112 may be verified against a threshold value by the processor 114 of weighing system 100 to determine the validity of a weight measurement. In one embodiment, the self-checkout vehicle 102 may be configured to scan each merchandise being placed into its storage space, and weight related information of each merchandise (e.g., a net weight as provided by a manufacturer, a mean weight, a weight standard deviation) in a specific retail store may be saved on memory 128 of weighing system 100 or retrieved from a local or remote database 106 that is in communication with the processor 114 via the communication network 108. As a merchandise is identified by a scanner device of the self-checkout vehicle 102, and placed on the load receiving element 112, the weight of the merchandise measured by the force sensor 116 of the load receiving element 112 may be compared to a weight range calculated from the mean and standard deviation data obtained by the processor 114 from the memory 128 or the database 106 for that item. If the weight falls within the range (e.g., weight: the standard deviation SD), the insertion of the merchandise into the vehicle 102 may be accepted. If the weight falls outside this range, especially in a self-checkout shopping context, processor 114 of weighing system 100 may generate signals to inhibit further weight measurements and optionally generate a notification to store staff as part of security measures.

In accordance with further aspects of the present disclosure, weighing system 100 may include a calibration module 130 configured to provide any necessary information and data to ensure successful operations of various sensors and components of weighing system 100. Examples may include coefficients for equations used in correction processes of various sensors and components such as temperature and angle, conversion factors for converting from raw sensor inputs to a designated measurement system (conversion to lbs, grams, degrees Celsius, etc. . . . ), any relevant constants including but not limited to offsets in angle with respect to the angle/orientation sensor 120 and the force-sensing axis of the load receiving element 112, and bias corrections for the temperature sensor 126. For example, as ambient conditions (e.g., temperature) may affect the load receiving element 112 and various sensors and circuitries of the weighing system 100 differently, different operational temperature ranges may be obtained and set for the load receiving element 112 and each sensor, such that measurement adjustment may be carried out independently.

It should be appreciated that weighing system 100 may have different form-factors. In one embodiment, weighing system 100 may include multiple load receiving elements 112 coupled to the self-checkout vehicle 102. The main body of each of the plurality of load receiving elements 112 is preferably a weather-resistant, low-profile enclosure structure configured to contain and protect various sensors, modules, components and electrical circuitry of the weighing system 100. Each load receiving element 112 may be positioned and secured underneath a selected area of the base of vehicle 102. The top surface of each load receiving element 112 may be a planar surface, parallel to the horizontal base of vehicle 102. Each load receiving element 112 may be configured to independently carry out a weight measurement. The processor 114 of weighing system 100 may be configured to execute and control various sensors and modules of each load receiving element 112 to determine an actual weight based on the input of each load receiving element 112 and inhibit a weighing operation in response to detecting that a sensor output exceeds a selected threshold, as described above.

FIG. 2 illustrates a flowchart of a method 200 implemented by the aforementioned weighing system 100, in accordance with aspects of the present disclosure. The method 200 comprises mounting (202) at least one load receiver on a shopping cart or basket for receiving an item placed into the shopping cart or basket for a weighing operation. The method 200 also comprises providing (204) a plurality of sensors on the shopping cart or basket and the at least one load receiver for detecting a plurality of parameters relating to the weighing operation of the item including at least one of: a relative angle between a force sensing axis of the at least one load receiver and a direction of gravity, a motion of the shopping cart or basket, and an ambient temperature surrounding the shopping cart or basket and the at least one load receiver. In addition, the method 200 comprises determining (206), by a processor, an actual weight of the item based at least on the plurality of parameters.

In various aspects, the systems and methods described herein may be implemented in hardware, software, firmware, or any combination thereof. If implemented in software, the method (e.g., method 200) may be stored as one or more instructions or code on a non-transitory computer-readable medium (e.g., memory 128). Computer-readable medium includes data storage. By way of example, and not limitation, such computer-readable medium can comprise RAM, ROM, EEPROM, CD-ROM, Flash memory or other types of electric, magnetic, or optical storage medium, or, my other medium that can be used to carry or store desired program code in the form of instructions or data structures and that can be accessed by a processor of a computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the mt having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system comprising:
one or more load receivers mounted to a shopping cart or shopping basket and configured to perform a weighing operation of items placed into the shopping cart or shopping basket;
one or more sensors configured to detect values of a parameter relating to the weighing operation of an item, wherein the one or more sensors comprise a motion sensor; and
a processor configured to:
detect a value of the parameter relating to the weighing operation of the item using the one or more sensors, wherein the value comprises a vibration value representing a measure of vibration of the shopping cart, wherein detecting the value comprises:
capturing a series of samples from the motion sensor; and
computing a difference between consecutive samples of the series of samples to generate the detected value;
compare a value of the parameter detected by the sensor to a threshold value; and
responsive to the value being less than the threshold value, determine an actual weight of an item placed in the shopping cart or shopping basket based on the value of the parameter detected by the sensor.

2. The system of claim 1, wherein the system comprises a self-checkout system.

3. The system of claim 1, wherein the one or more sensors comprises an orientation sensor.

4. The system of claim 3, wherein the orientation sensor comprises a force-sensing axis that is perpendicular to the direction of gravity when the shopping cart is not tilted.

5. The system of claim 4, wherein the processor is further configured to:
receive a force measurement from the orientation sensor along the force-sensing axis;
identify that the force measurement from the orientation sensor is equal to zero; and
responsive to the force measurement being zero, determine that a tilt angle of the shopping cart is zero degrees.

6. The shopping cart of claim 4, wherein the processor is further configured to:

receive a force measurement from the orientation sensor along the force-sensing axis;

identify that the force measurement from the orientation sensor is equal to 1G; and responsive to the force measurement being 1G, determine that a tilt angle of the shopping cart is ninety degrees.

7. The system of claim 1, wherein the one or more sensors comprise an accelerometer or a gyroscope.

8. A system comprising:

one or more load receivers mounted to a shopping cart or shopping basket and configured to perform a weighing operation of items placed into the shopping cart or shopping basket;

one or more sensors configured to detect a parameter relating to the weighing operation of an item, wherein the one or more sensors comprise a motion sensor; and a processor configured to inhibit a weighing operation of an item placed in the shopping cart or shopping basket based on a parameter detected by the one or more sensors exceeding a threshold, wherein inhibiting the weighing operation based on the parameter detected by the one or more sensors comprises:

detecting a value of the parameter relating to the weighing operation of the item using the one or more sensors, wherein the value comprises a vibration value representing a measure of vibration of the shopping cart, wherein detecting the value comprises:

capturing a series of samples from the motion sensor; and computing a difference between consecutive samples of the series of samples to generate the detected value.

9. The system of claim 8, wherein the processor is further configured to:

transmit a signal to the one or more load receivers to inhibit the one or more load receivers from capturing a weight measurement.

10. The system of claim 8, wherein the processor is further configured to:

display a reading on a digital weight indicator of the shopping cart that indicates that a weight measurement was not taken.

11. The system of claim 8, wherein the system further comprises a self-checkout system.

12. The system of claim 8, wherein the one or more sensors comprise an orientation sensor.

13. The system of claim 12, wherein the orientation sensor comprises a force-sensing axis that is perpendicular to the direction of gravity when the shopping cart is not tilted.

14. The system of claim 13, wherein the processor is further configured to:

receive a force measurement from the orientation sensor along the force-sensing axis;

identify that the force measurement from the orientation sensor is equal to zero; and responsive to the force measurement being zero, determine that a tilt angle of the shopping cart is zero degrees.

15. The system of claim 13, wherein the processor is further configured to:

receive a force measurement from the orientation sensor along the force-sensing axis;

identify that the force measurement from the orientation sensor is equal to 1G; and responsive to the force measurement being 1G, determine that a tilt angle of the shopping cart is ninety degrees.

16. The system of claim 8, wherein the one or more sensors comprise an accelerometer or a gyroscope.

* * * * *